Sept. 29, 1970      J. R. MITCHELL      3,531,067

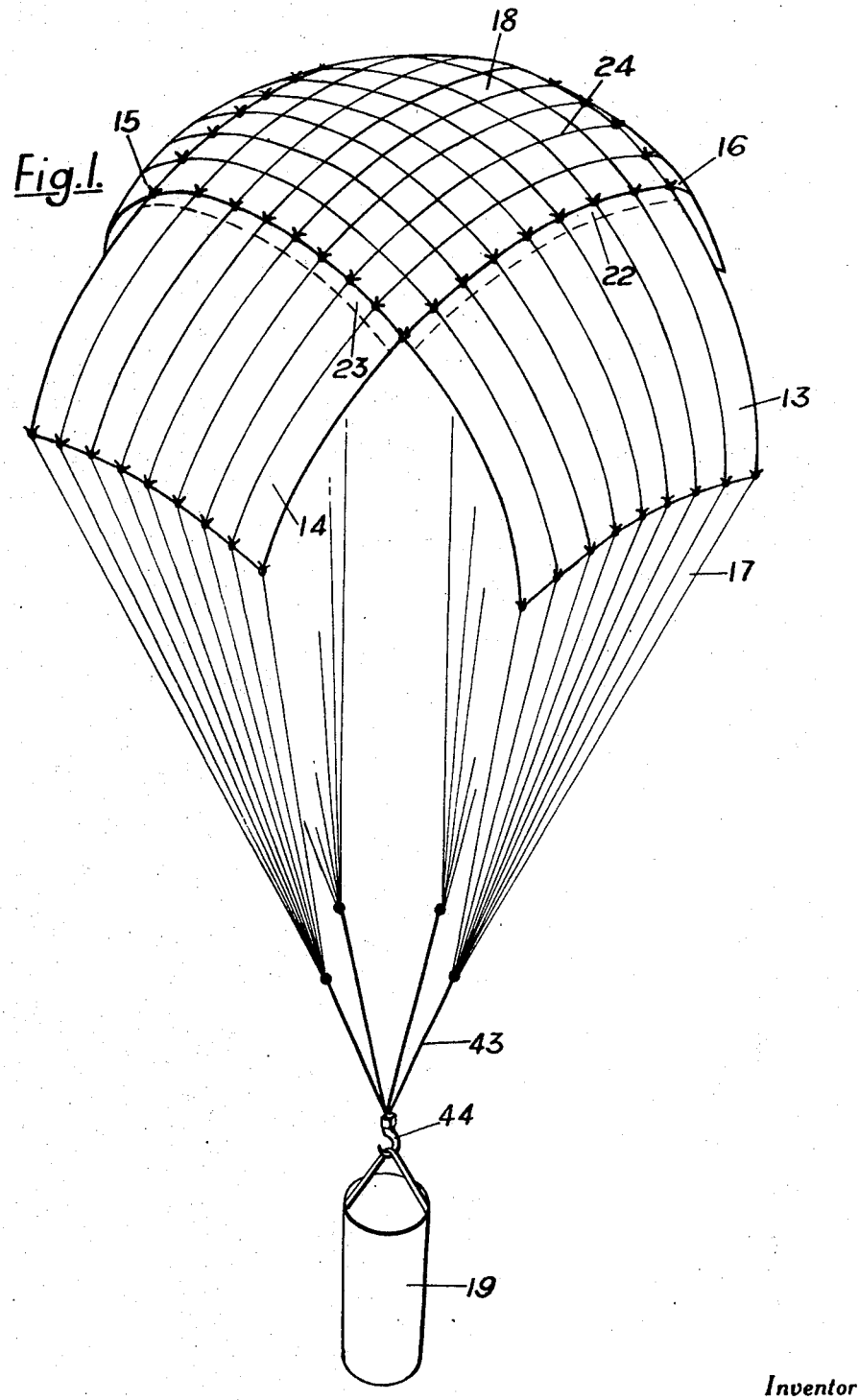

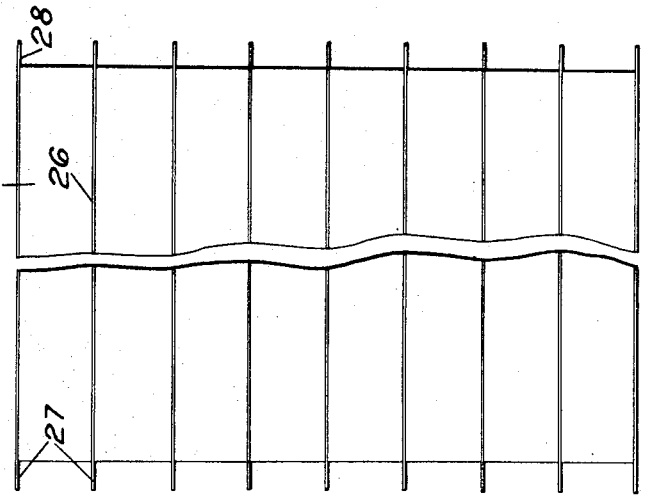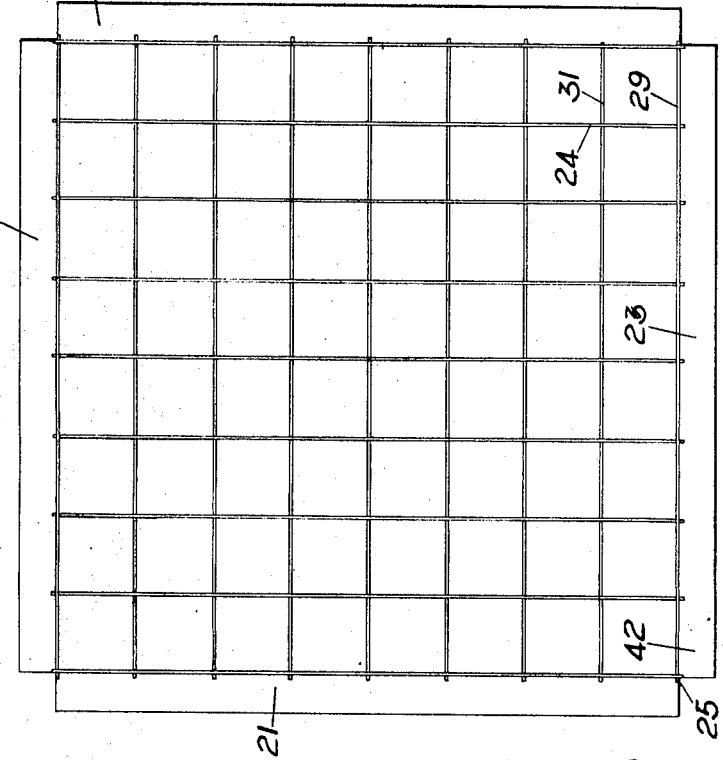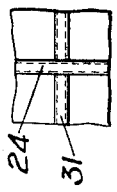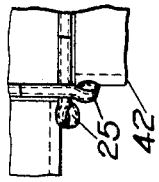

PARACHUTES

Filed Sept. 9, 1968      4 Sheets-Sheet 3

Inventor

JOHN ROTHWELL MITCHELL

By

Shoemaker and Mattare

Attorneys

Sept. 29, 1970 J. R. MITCHELL 3,531,067
PARACHUTES
Filed Sept. 9, 1968 4 Sheets-Sheet 4
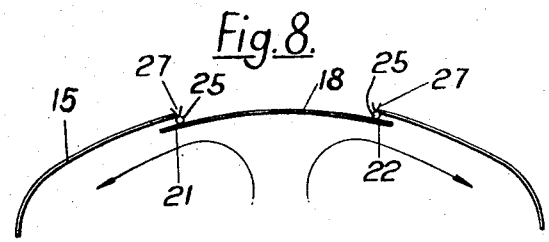
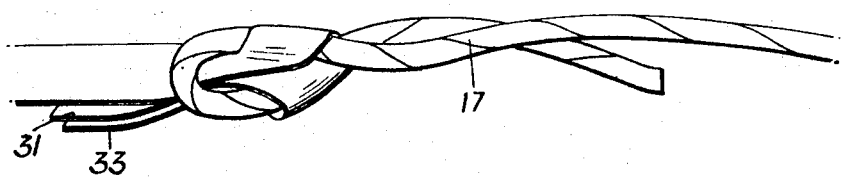
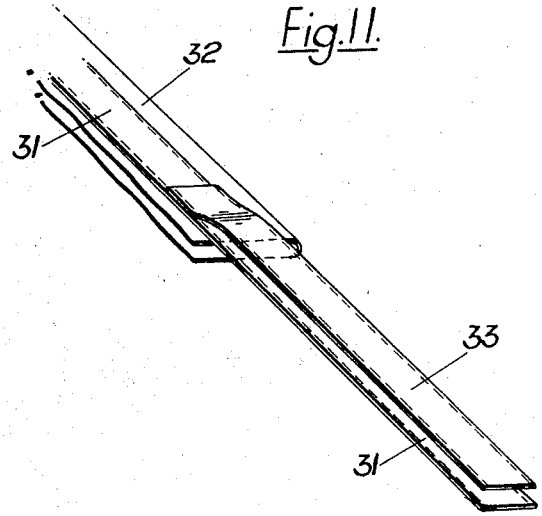
Inventor
John Rothwell Mitchell
By
Shoemaker and Mattare
Attorneys United States Patent Office 3,531,067
Patented Sept. 29, 1970

3,531,067
PARACHUTES
John Rothwell Mitchell, Woking, England, assignor to G. Q. Parachute Company Limited, Woking, England, a British company
Filed Sept. 9, 1968, Ser. No. 758,281
Claims priority, application Great Britain, Oct. 4, 1967, 45,107/67; Mar. 2, 1968, 10,277/68
Int. Cl. B64d 17/02
U.S. Cl. 244—145                                 8 Claims

ABSTRACT OF THE DISCLOSURE

A parachute has a canopy comprising a crown and a number of wings which are tied to the crown, the crown having a skirt which extends below the wings and bridges the gaps between the wings and the crown to prevent airflow through the gaps between the crown and the wings. The crown is made of one or more sections which can be tied together to give a larger crown. Each wing is made of one or more sections which can be tied together to give longer wings or placed side by side to give wider wings. The canopy is made from ribbons of polypropylene woven into a fabric. The canopy and wings are reinforced by tapes, extensions of the tapes being used to tie the parts of the parachute together.

This invention relates to parachutes and particularly to the construction of parachutes having canopies with a number of wings to which are joined the rigging lines which connect the parachute canopy to a load.

Canopies of this type are usually in the form of crosses or stars having rectangular or polygonal centres.

One of the objects of this invention is to make such canopies by connecting together a group of standardized sections which can be combined in differing ways, as, when, and where required, to give parachutes for carrying loads of differing weights.

Another object of the invention is to make such canopies of materials which are cheap and easy to obtain.

According to this invention a parachute comprises a canopy and rigging lines for connecting the canopy to a load, in which the canopy consists of a crown comprising one or more sections of fabric, and a number of wings, the crown extending below the wings to bridge the joints between the wings and the crown.

The invention also comprises a parachute consisting of a canopy and rigging lines for connecting the canopy to a load in which the canopy consists of a crown and a number of wings to which the rigging lines are attached, the crown being provided with a skirt which extends below the wings to bridge the joints between the crown and the wings.

The invention also comprises a parachute consisting of a canopy and rigging lines for connecting the canopy to a load in which the canopy comprises a crown and a number of wings to which the rigging lines are attached, the crown having a rectangular or polygonal centre, made in one piece or of a number of similarly shaped sections tied or otherwise connected together, and extending below the wings to bridge the joints between the crown and the wings.

The invention also comprises a collection of sections assembly to form a parachute having a canopy and rigging lines for connecting the canopy to a load, in which the canopy comprises a crown, consisting of a plurality of crown sections which have means by which they can be connected together, for example by tying, to form crowns of differing sizes and/or shapes, and a number of wing sections which have means by which they can be connected to the crown and to each other, for example by tying, to give wings of different sizes, the crown extending below the wings when assembled to prevent airflow through the connections between the crown and wings.

The crown and wings may be made of material such as material woven from polypropylene ribbon which may be strengthened by tapes or similar re-inforcement attached to the material. The tapes may be used for connecting, as by tying, the rigging lines to the wings and the wings to the crown of the canopy.

Figure 4:
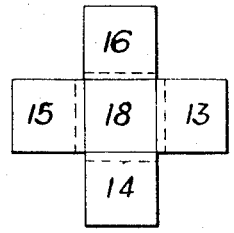
Figure 12:
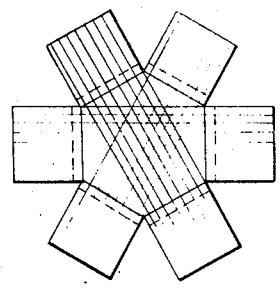

The invention is described hereinafter with reference to the accompanying drawings of which FIG. 1 shows one form of parachute according to the invention, FIG. 2 shows the construction of the crown section of the canopy of the parachute shown in FIG. 1, FIGS. 2a and 2b show the details of the overlap and termination of the crown reinforcing tapes, FIG. 3 shows the construction of one of the wing sections of the same canopy, FIG. 4 is a plan of the canopy shown in FIG. 1, FIGS. 5, 6, 7 show some canopies according to the invention, FIG. 8 illustrates the airflow within the canopy shown in FIG. 1, FIGS. 9, 10, 11 illustrate the construction of parts of the canopy, and FIG. 12 illustrates the canopy of a parachute according to the invention having a hexagonal crown.

The parachute illustrated in FIGS. 1, 2, 3, and 4 comprises a crown section 18 which is connected by wing sections 13, 14, 15 and 16 and rigging lines 17 to a load 19.

The canopy can be made of any suitable porous or impervious material. We prefer to use material woven from polypropylene ribbon; that is strips of polypropylene about 1/16 inch or so in width cut from sheets of polypropylene which strips are woven into material. The material is cut to the sizes required and preferably the edges are sealed to prevent fraying and disintegration of the fabric. The desired porosity for the fabric is obtained by variation as required of the width of the strips from which the material is woven and adjustment as necessary of the tightness of the weave. The porosity of the fabric is not critical so long as it is low, the porosity of the canopy as a whole being controlled automatically by the airflow through the open corners between the wings of the canopy. For the canopy illustrated the material was cut into pieces each about 40 inches wide and about 13 feet long for the crown and wing sections and about 10 inches wide for the skirt panels referred to hereinafter. The wing and crown sections (excluding the skirt panels) are squares with sides of about 13 feet.

The material for the crown and wing sections is re-inforced by tape, which could be made of terylene about ½ inch in width, stitched or otherwise joined to the material. The crown and wing sections shown are made from a number of pieces of material stitched or otherwise joined together, as shown in FIG. 9 the edges of the pieces of material are placed together and the re-inforcing tape 30 is stitched to the material as the seam is made. As the material has a fold 32 at the centre, a reinforcing tape 31 is stitched along the fold. The edge tapes 29, and the tapes 24 running at right angles to the joints in the material are sewn flat onto the fabric. The tapes on the crown section 18 of the canopy terminate in loops 25.

The crown 18 is provided with four skirt panels 20, 21, 22 and 23. These are additional strips of material which are stitched onto the edges of the crown section 18 as the edge tapes are being stitched to the material. The skirt panels have their ends turned back as shown at 42 so that they are of the same length as the edges of the crown. The skirts around the crown could be formed by extensions of the material making the crown. In this case the re-inforcing tapes end about 10 inches from the edges of the crown.

The re-inforcing tapes 26 on the wing sections are carried beyond the ends of the fabric to form extensions 27, 28. The upper extensions 27 can be tied to the loops 25 at the ends of the tapes 24 on the crown section 18 to connect the wing sections to the crown section, and the lower extension 28 can be tied to the rigging lines 17 to connect the canopy to the load 19. The lower ends 28 of the tapes can be formed into loops if desired.

When the wing sections 13, 14, 15 and 16 are tied to the crown section 18, the skirt panels 20, 21, 22 and 23 lie on the inside of the canopy, as shown in FIG. 8, to close the gaps between the wing sections and the crown section. These skirt panels are of sufficient width to extend under the wing sections as shown in FIG. 8 so that the air flow beneath the canopy crown is directed down the wing sections as shown by the arrows.

The loops and extensions on the wings and crown tapes can be made from double tape. FIG. 11 illustrates such an arrangement, an extra length of tape 33 being attached to the re-inforcing tape 31. In the figure the re-inforcing tape 31 is that at a fold 32 of the material. The extra tape 33 extends a short distance only along the canopy fabric.

The rigging lines 17 can be tied to the loops or extensions 28 at the lower ends of the wings, suitable knots being reef knots or sheet bends. Such a tie is shown in FIG. 10 where the rigging line 17 is shown tied to the extension tapes 31 and 33 from a point on one of the wings. The rigging line can be made of any suitable material, such as for example string made from fibrillated polypropylene. The lower ends of the rigging lines are connected to webbing strops 43 and a hook 44 from which the load 19 is suspended. These webbing strops 43 are not an essential feature.

Figure 5:
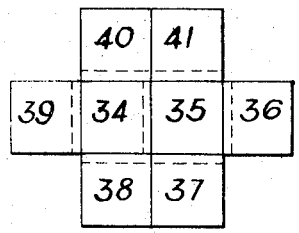
Figure 6:
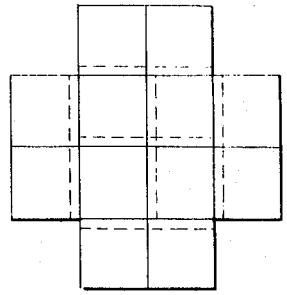
Figure 7:
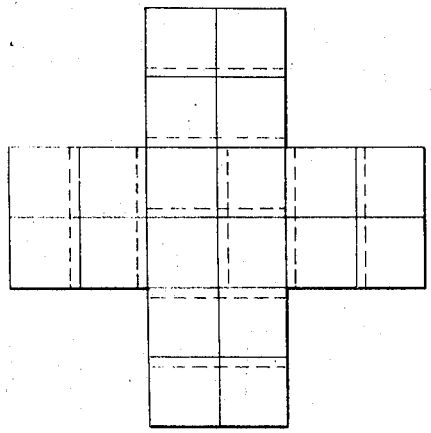

The canopy described above would be suitable for use with loads of about 500 lbs. weight. The crown and wing sections can however be assembled in different ways to make parachutes for carrying loads of other weights. Some such arrangements are illustrated by FIGS. 5, 6 and 7. In FIG. 5 two crown sections 34 and 35 are connected together and are combined with six wing sections 36, 37, 38, 39, 40 and 41. Such a combination would carry loads of up to about 800 lbs. In FIG. 6 four crown sections are shown connected to eight wing sections to give a parachute capable of carrying a load of about 1200 lbs. weight. In FIG. 7 four crown sections are shown combined with sixteen wing sections to give a canopy suitable for loads of up to about 2000 lbs. weight. In this last arrangement the upper wing sections are provided at their lower ends with skirt panels which extend under the lower wing sections. Where more than one crown section is used two skirt panels come together at the joints in the crown. One of these skirt panels could be removed if desired, but if both are left they cause no trouble to the operation of the parachute.

In FIGS. 2 and 3, nine tapes are shown crossing the crown section of the canopy, and along the wing sections and nine rigging lies are provided to each wing. More or less tapes and rigging lines can be provided if desired.

The parachutes described above have canopies with rectangular crowns. The crowns can be of other shapes, and a canopy having a crown of hexagonal shape is shown in FIG. 12. Crowns having more or less sides can be used if desired, for example the crown could be the shape of any regular polygon such as an equilateral triangle or a regular pentagon.

It will be appreciated that the parachute can be made of materials other than polypropylene, and that the canopy need not all be made from the same material, for example the crown and wings could be made of one type of material and the skirt sections of a different material, or the crown of one material and the wings of a different material.

The tapes on the crown need not terminate in loops. Extensions can be left which can be tied to the extensions of the wing tapes, or both crown and wing tapes can end in loops which can be connected together by tying or by toggles or hooks or in any suitable way.

The invention is not restricted to parachutes in which the canopies have wing and crown sections with re-inforcing tapes. With some materials these tapes may not be required. Neither the invention restricted to canopies having the wings tied to the crown; the wings can be connected to the crown by any suitable connecting means, for example, they could be laced together or connected by rings or pins passing through eyelets, or apertures in studs, carried by the parts of the canopy.

I claim:

1. A parachute comprising a canopy of modular construction and rigging lines for connecting the canopy to a load, the canopy comprising a crown section and a plurality of separate wing sections, the crown section being of a polygonal shape and comprising a plurality of strips joined together along their meeting edges, a first set of tapes attached to the crown section along the meeting edges, a second set of tapes across the crown section at an angle to the first set of tapes, the ends of both sets of tapes extending beyond the edges of the crown section, a skirt attached to each side of the crown section, each wing section comprising a plurality of strips joined together along their meeting edges, tapes attached to the wing section along the meeting edges and extending beyond the opposite ends thereof, a wing section being connected to an adjacent side of the crown section by detachably connecting the tapes of one end thereof to the tapes on the adjacent side of the crown section, each skirt extending under and covering each joint of the crown section and respecting wing section and the tapes of the opposite end of each wing section being connected to the rigging lines.

2. The parachute as set forth in claim 1 wherein the modular construction consists of a plurality of panels comprising the canopy and wherein the crown section comprises at least one panel and the wing sections comprise a plurality of panels detachable connected to adjacent sides of the crown section.

3. The parachute as set forth in claim 2 wherein the panels are of polygonal shape.

4. The parachute as set forth in claim 1 wherein the modular construction of the canopy consists of a plurality of polygonal shaped panels, the crown section comprising a plurality of panels, the panels being detachably connected together by the tapes on adjacent sides into a larger section of polygonal shape, the skirts on the panels underlying the joints of the connected panels, and the wing sections being connected to the adjacent outer sides of the crown section.

5. The parachute as set forth in claim 4 wherein the wing sections comprise a plurality of inner and outer panels, the inner panels being connected to adjacent sides of the panels comprising the crown section, skirts extending from at least one side of the inner panels, the outer panels being connected to the inner panels with the skirts covering and extending under the connections between the inner and outer panels.

6. The parachute as set forth in claim 1 wherein at least part of the canopy is made from polypropylene.

7. The parachute as set forth in claim 1 wherein at least part of the rigging lines is made from fibrillated polypropylene.

8. The parachute as set forth in claim 1 wherein the canopy is provided with reinforcing tapes to strengthen the other tapes and the connections between the crown and wing sections.

References Cited
UNITED STATES PATENTS

| | | | |
|---|---|---|---|
| 2,089,140 | 8/1937 | Tricau | 244—145 |
| 3,298,635 | 1/1967 | Barish | 244—145 X |
| 3,331,573 | 7/1967 | Winker et al. | 244—145 |

MILTON BUCHLER, Primary Examiner

J. E. PITTENGER, Assistant Examiner